(12) United States Patent
Rodda et al.

(10) Patent No.: US 12,253,498 B2
(45) Date of Patent: Mar. 18, 2025

(54) METHOD AND DEVICE FOR CHARACTERISING A FLUID SAMPLE

(71) Applicant: Alpha M.O.S, Toulouse (FR)

(72) Inventors: Errol Mark Rodda, San Jose, CA (US); François Loubet, Avignonet-Lauragais (FR)

(73) Assignee: Alpha M.O.S, Toulouse (FR)

(*) Notice: Subject to any disclaimer, the term of this patent is extended or adjusted under 35 U.S.C. 154(b) by 667 days.

(21) Appl. No.: 17/258,224

(22) PCT Filed: Jul. 10, 2019

(86) PCT No.: PCT/EP2019/068479
§ 371 (c)(1),
(2) Date: Jan. 6, 2021

(87) PCT Pub. No.: WO2020/011822
PCT Pub. Date: Jan. 16, 2020

(65) Prior Publication Data
US 2021/0285922 A1    Sep. 16, 2021

(30) Foreign Application Priority Data
Jul. 10, 2018    (EP) .................................. 18305921

(51) Int. Cl.
*G01N 30/88*    (2006.01)
(52) U.S. Cl.
CPC ..... *G01N 30/88* (2013.01); *G01N 2030/8804* (2013.01); *G01N 2030/8881* (2013.01)
(58) Field of Classification Search
CPC ........... G01N 30/88; G01N 2030/8804; G01N 2030/8881
See application file for complete search history.

(56) References Cited

U.S. PATENT DOCUMENTS 5,157,958 A * 10/1992 Geisinger ............ B67D 7/3209
73/1.02
6,153,438 A    11/2000 Blumberg et al.
(Continued)

FOREIGN PATENT DOCUMENTS

EP    2718705 A1    4/2014
EP    3091354 A1    11/2016
(Continued)

OTHER PUBLICATIONS

Foreign Communication from a Related Counterpart Application, IEurope Examination Report dated Feb. 3, 2022, EP Application No. 18305921.1.
(Continued)

*Primary Examiner* — Jamel E Williams
*Assistant Examiner* — Alex T Devito
(74) *Attorney, Agent, or Firm* — Conley Rose, P.C.

(57) ABSTRACT

A modular fluid characterisation system is provided. The modular fluid characterisation system includes a sampling unit containing optional pre-processing units to condition samples, and a valve network to distribute samples to one or more characterisation modules. Each characterisation module includes one or more instruments for characterising samples, and optional additional pre-processing units. Characterising modules can be added or removed depending on operational requirements. Sample flows are controlled in accordance with an automated characterisation program, and resulting characterisation may be obtained on the basis of a combination of results from different characterisation modules with regard to the characterisation program.

15 Claims, 7 Drawing Sheets

(56) References Cited

U.S. PATENT DOCUMENTS

| | | | |
|---|---|---|---|
| 2001/0051110 A1* | 12/2001 | Borade | G01N 31/10 422/68.1 |
| 2005/0032072 A1* | 2/2005 | Kautzer | B82Y 30/00 435/6.12 |
| 2011/0189052 A1 | 8/2011 | Jaeggi et al. | |

FOREIGN PATENT DOCUMENTS

| | | |
|---|---|---|
| WO | WO 2012/024663 A1 | 2/2012 |
| WO | WO 2013/028828 A1 | 2/2013 |
| WO | WO 2013/074629 A2 | 5/2013 |
| WO | WO 2017/103180 A1 | 6/2017 |

OTHER PUBLICATIONS

European Patent Office, Extend European Search Report received for Application No. 18305921.1, Jan. 31, 2019, 11 pages, Germany.
International Searching Authority, International Search Report and Written Opinion received for International Application No. PCT/EP2019/068479, dated Oct. 8, 2019, 15 pages, European Patent Office, Netherlands.

* cited by examiner

METHOD AND DEVICE FOR CHARACTERISING A FLUID SAMPLE

CROSS-REFERENCE TO RELATED APPLICATIONS

The present application is a national phase entry of PCT/EP2019/068479, filed on Jul. 10, 2019, which claims the benefit of priority of EP patent application Ser. No. 18/305,921.1, filed Jul. 10, 2018, the entire contents of which are hereby incorporated by reference in their entirety for all purposes.

FIELD

The present invention relates to the characterisation of chemical components of complex matrices for example in the context of product quality control.

BACKGROUND

Detection of chemical components designates the identification of the type and/or quantity of one or several chemical components. In the general field of chemical detection, an analyte designates a substance or component of particular interest for a chemical measurement. A transducer is an element that converts the information from a sensor into a physical signal (for example electrical intensity) representative of the detection of substance or components by the sensor. The sensitivity represents the ability of a sensor to detect even a small quantity of a component. The selectivity designates the ability to precisely determine the component that has been detected by a sensor.

A large number of biochemical sensors exist. For example, gas chromatography consists in passing gas components in a column. For a definite composition of a static phase in the column, each type of component is characterised by a specific duration for crossing the column, which is called retention time. In usual gas chromatography systems, a detector is placed at the end of the column, which outputs at any time a value representative of the quantity of components that leaves the column. A component that is present with a large concentration in a fluid processed in a gas chromatograph therefore generates a peak of intensity around the retention time characterising the component. The analysis of gas chromatography peaks, and comparison with reference values for a set of analytes is a widely used method of determination of the type and quantity of components present in a fluid.

However, the selectivity of a gas chromatography sensor may be limited if several components have comparable retention times, or if the time resolution of the sensor at the end of the column is not high enough to disambiguate the peaks generated by two different analytes.

CMOS gas sensors, for example metal oxide gas sensors form another family of biochemical sensors for the detection of components in a gas. A metal oxide gas sensor modifies the sensitivity of an electrical component according to the concentration of some components in a gas, and parameters specific to the sensor, such as the chemical composition of the sensing layer, and the temperature at the surface of the layer. Some metal oxide sensors are designed in terms of surface composition and temperature to precisely detect a single analyte. On the other hand, some metal oxide sensors are driven to generate measurements at various temperatures, the change of sensitivity due to each analyte varying with the temperature of the surface of the sensor. However, due to the large number of possible analytes and the possibility that many analytes modify the sensitivity of the sensor at the same temperature, the selectivity of such a sensor to a large number of analytes remains low. Such drawbacks may be mitigated by using 2D arrays of CMOS sensors, each sensor in an array being sensitive to different analytes in a gas, this is usually known as electronic nose system in which the complementarity of the different sensors from the array will allow to differentiate different compositions of the product. Also, 3D stacks of CMOS sensors can be used to increase selectivity of the sensor arrangement, such as those disclosed in the European patent application co-assigned to the applicant of this application which is published under no EP2718705. The determination of analytes is generally based on a comparison of actual measurements with reference values obtained from a library. For example, in gas chromatography an analyte can be identified by comparing the retention time of a peak to a set of theoretical retention times for different analytes in the same gas chromatography column. However, the determination of the type of an analyte requires that a theoretical value already exists from a reliable source for this analyte. Due to the large number of possible analytes, it is therefore desirable to use theoretical data from as large a number of sources as possible.

In gas chromatography, the Kovats index is a generalisation of the retention time of a compound for a type of column, a type of column being determined by the stationary phase of the column. The values of retention times for each peak can be converted, according to parameters such as the length of the columns, the temperature, etc to a Kovats index which only depends of a type of column, therefore allowing comparison between different columns having the same stationary phase, and the collaborative creation of large databases.

U.S. Pat. No. 6,153,438 discloses a method for determining that an unknown analyte is present by comparing retention times in gas chromatography to known retention times in a database. However, the use of a single GC (gas chromatography) column type does not solve the issue of the selectivity of components when a plurality of analytes has close retention times. Also, according to the disclosure of this patent, it is not possible to identify the analyte. Similar methods exist for other types of sensors. For example, it is possible to build a database of the temperatures that correspond to peaks of sensitivity for given analytes for metal-oxide gas sensors, and use this database to determine a type of gas analyte according to the measurement from an unknown sample. An approach along these lines is described in EP3091354. These statements are also valid for detection in liquid matrix. For example, the spectrometry detection methods such as UV, NIR or Raman allow to characterise a sample, but do not provide sufficient information to identify the analyte. Such a Database makes it possible to determine a type of liquid analyte.

It is a characteristic of most of the characterisation methods discussed above that any given detector will generally be suited to a particular analyte, or a relatively narrow class of analytes. In many applications, it is desirable to provide a system which is capable of processing a wide range of analytes.

SUMMARY

In accordance with the present invention in a first aspect there is provided a system for characterising a fluid sample, the system comprising a first sample inlet channel configured to receive a fluid sample, a first plurality of valves each receiving fluid from the first inlet channel, a plurality of fluid characterising modules, each characterising module receiving fluid from a valve, and a controller in communication with the valves, the controller being adapted to control the position of each valve in accordance with a characterisation program.

In a development of the first aspect, the system further comprises one or more pre-processing units, each pre-processing unit being provided between the inlet channel and one or more of the first plurality of valves, the pre-processing units being adapted to condition a fluid arriving in the sample inlet channel.

In a development of the first aspect, one or more of pre-processing units comprise one of a gas/liquid/solid separation unit, an analyte concentration or dilution unit, a chemical reaction unit, a cooler, a heater, a dryer, a stirrer, a pressure modification unit, a stabilisation unit, a buffering unit or a titration unit.

In a development of the first aspect, the system comprises one or more further inlet channels, and one or more respective pluralities of valves receiving fluid from a respective further inlet channel, wherein one or more pre-processing and/or characterising modules are coupled to receive fluid from a respective valve receiving fluid from the first inlet channel and each further inlet channel respectively, such that by operation of the valves a fluid sample may by conveyed from any inlet channel to any characterising module.

In a development of the first aspect, the system further comprises a support structure, wherein each characterising module is removably mounted in support structure, and wherein each characterising module receives fluid from a respective valve via a respective releasable input coupling.

In a development of the first aspect, the system comprises an exhaust manifold, and each characterising module comprises an exhaust port, wherein the exhaust port of each characterising module is configured to eject fluid received from the respective valve and processed by the respective characterising module into the exhaust manifold.

In a development of the first aspect, the system further comprises a support structure, wherein each characterising module is removably mounted in the support structure, and wherein each characterising module ejects fluid into the exhaust manifold via a respective releasable output coupling.

In a development of the first aspect, each of the characterising modules is selected from a plurality of characterising module types comprising: a gas chromatograph, a gas sensor, a liquid sensor, a spectrometer, an ion specific electrode, or an array of a plurality of the foregoing.

In a development of the first aspect, the fluid is of a predefined type, and wherein the type of each characterising module is selected as a function of the type of the fluid sample, whereby the characterisations of the characterising modules in aggregate constitute an optimised characterisation of the fluid.

In a development of the first aspect, the system further comprises a characterisation processor receiving characterisation data from each characterisation module, the characterisation processor being configured to generate a refined characterisation on the basis of the data received from each characterisation module.

In a development of the first aspect, the characterising processor is further adapted to control the operation of the valves, so as to cause a fluid sample to be conveyed from an inlet channel to one or more characterising module in accordance with a characterising program.

In a development of the first aspect, one or more inlets are adapted to receive the fluid in-line from a production channel, or wherein one or more inlets are adapted to receive the fluid in-line from an auto sampler.

In accordance with the present invention in a second aspect there is provided a method of operating a fluid characterising system comprising a plurality of characterising modules operated under the control of a characterising program, the method comprising the steps of determining a sample fluid type, determining the capacities of available characterising modules, determining pre-processing and characterising requirements for the determined fluid sample type, determining whether an adequate characterisation of the determined sample fluid type can be obtained with the available characterisation modules, and compiling the characterisation program on the basis of the results of the determination of the characterising requirements for the determined fluid sample type, and executing the characterisation program.

In a development of the second aspect, the method may comprise the further steps of receiving outputs from said characterisation modules in response to execution of said characterizing program, and processing said outputs to obtain a final sample characterisation.

In accordance with the present invention in a third aspect there is provided a characterisation program for operating a fluid characterising system in accordance with the second aspect.

In a development of the third aspect, the characterisation program is obtained by the steps of determining a sample fluid type, determining the capacities of available characterising modules, determining pre-processing and characterising requirements for the determined fluid sample type, and determining whether an adequate characterisation of the determined sample fluid type can be obtained with the available characterisation modules.

BRIEF DESCRIPTION OF THE DRAWINGS

The invention will be better understood and its various features and advantages will emerge from the following description of a number of exemplary embodiments and its appended figures in which.

DETAILED DESCRIPTION

Figure 1:
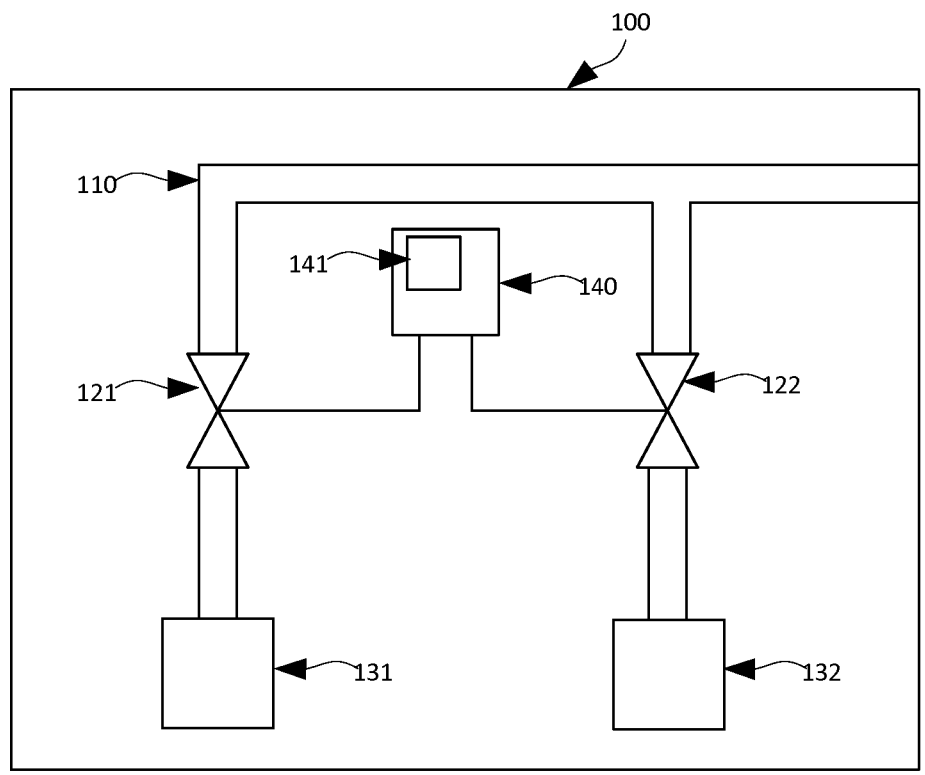
FIG. 1 shows a system in a first embodiment.

FIG. 1 shows a system in a first embodiment. As shown in FIG. 1 there is provided a system 100 for characterising a fluid sample.

As discussed hereafter, the sample may be extracted "in-line" in a production line, for example a production line for a food or drink product. Alternatively, the sample may be an isolated sample injected into the inlet channel as required.

The term fluid as used throughout the present description should be understood in its broadest sense, that is, any medium which is able to flow in the temperature and pressure ranges in which measurements may be taken.

Accordingly, fluids may include liquids, gases, plasmas, viscous solids or masses of dust or powder. Fluids may also include a combination of such substances, which may be of similar or homogenous types, such as emulsions, aerosols, particles of solid or liquid dispersed in a gaseous carrier or otherwise. This may include a fluid comprising only one, or a plurality of different molecules, some or all of which may correspond to the sample to be characterised, while others may be inert or otherwise merely serve as carriers, and not to be characterised.

It should also be born in mind that the phase of matter of the sample is of significance in that it is in this phase that the sample is expected to react with the sensor. It is entirely possible that in parts of the system away from the gas sensor, the sample may exist in another form.

As shown the system 100 comprises a first sample inlet channel 110 configured to receive a fluid sample.

The system 100 further comprises a first plurality of valves 121, 122 each receiving fluid from the first inlet channel.

The system further comprises a plurality of further fluid characterising modules 131, 132, each characterising module receiving fluid from a respective valve 121, 122.

It will be appreciated that while as shown there are provided two characterising modules and correspondingly two valves, there may be provided any number of characterising modules and valves, and that one or more several characterising modules may receive fluid from the same valve, and that each characterising modules may receive fluid from one or more valves. As such there may be a one to one relationship between the characterising modules and the valves, with each characterising module being associated with a respective valve, or any other configuration as required. Characterising modules may be coupled to receive a fluid flow in series or in parallel.

Each of the characterising modules is selected from a plurality of characterising module types. Possible characterising module types include a Gas Chromatograph (GC-MS, GC-IR, GC-FID, GC-sensor, . . . ), a Gas Sensor, Gas sensor array such as an electronic nose, a liquid sensor or liquid sensor array such as an electronic tongue, a spectrometer (UV, NIR, IR, Raman, . . . ), Flame ionisation detector (FID), electrochemical cells, ion specific electrodes (ISE), chemical specific electrodes (MIP, ChemFET, enzymatic, . . . ), colorimetry sensors, voltammetry, impedance, potentiometric, amperometry sensors, a brix unit, a refractometer, Ion-mobility spectrometry (IMS), photoionisation detector (PID), liquid chromatography, and so on. The skilled person will appreciate that there exist a wide range of additional possible characterising module types. A characterising module may additionally comprise any combination of such types.

The system 100 further comprises a controller 140 in communication with the valves 121, 122. The controller 140 is adapted to control the position of each valve in accordance with a characterisation program 141. The characterisation program is shown schematically as being a component of the controller 140, however it will be appreciated that the characterisation program may be stored in a memory accessible by the controller 140. In general terms, the characterisation program determines the sequence of operations performed in the system, determining when particular valves open or close to direct the flow of fluid samples through the system so as to arrive in the desired sensor at the desired time. The characterisation program may additionally control any operating condition of any part of the system. The characterisation program may additionally control particular valves to open or close to direct the flow of other fluids such as drying fluids, cleaning fluids, carrier fluids and the like through the system so as to arrive in the desired sensor at the desired time. In some cases the characterisation program may simply define the timing of the various operations. In other cases, the characterisation program may comprise structured logic implementing forks and the like, so that particular operations may take place when certain criteria are met, e.g. when a temperature reaches a desired level, etc. Still further, the characterisation logic may be defined in such a way as to dynamically implement characterisation by following particular paths so as to select different operating conditions, add or remove characterisations steps and so on, on the basis of intermediate characterisations obtained at earlier stages of the characterisation program.

As described in further detail below, the controller may further be adapted to adjust relevant parameters for each characterising module and to compute the generated data in order to provide pertinent characterisation information on the analyzed sample.

This characterisation program may be automatically selected or defined to correspond as closely as possible to the type of sample to be characterised, in the light of the characterisation modules available in the system. The characterisation program may be automatically selected on the basis of any available information about the type of sample being characterised. This may involve user input in order to provide any available information about the sample—for example, the user might specify that the sample was a particular foodstuff type, which may suggest that readings from particular characterisation modules are most likely to be meaningful. Alternatively, the system may communicate with other devices to obtain relevant information for example, a production line may be able to provide information about its contents, or product packaging may have bar codes, RFID tags or other identifiers that can be used to retrieve additional information supporting optimal definition of the characterisation program.

Figure 2:
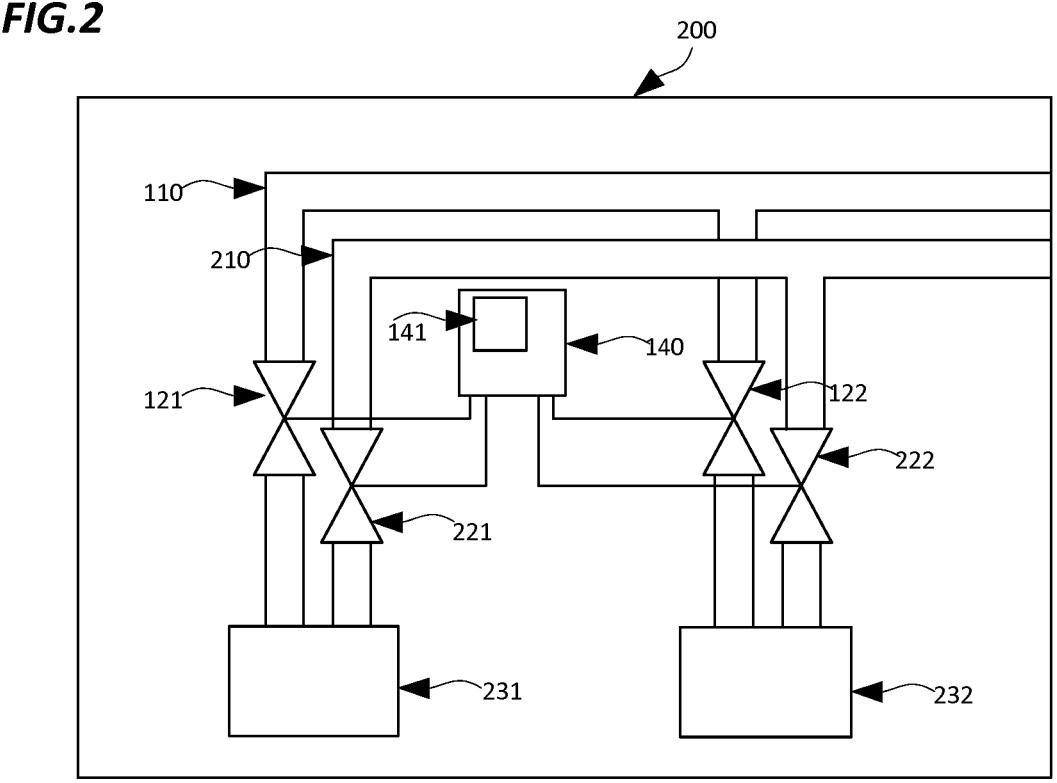
FIG. 2 shows a system in a second embodiment.

FIG. 2 shows a system in a second embodiment. As shown in FIG. 2 there is provided a system 200 for characterising a fluid sample.

As shown in FIG. 2 the system 200 comprises the same components as described above with respect to FIG. 1. As shown the system further comprises a further inlet channel 210, and correspondingly a further plurality of valves 221, 222 receiving fluid from the further inlet channel 210. The characterising modules 231, 232 are coupled to receive fluid from a respective valve 121, 221, 122, 222 receiving fluid from the first inlet channel 110 and the further inlet channel 210 respectively, such that by operation of the valves 121, 221, 122, 222 a fluid sample may by conveyed from any inlet channel 110, 210 to any characterising module 231, 232. It will be appreciated that while as shown one additional inlet channel and corresponding valve is presented, any number of such additional inlet channels and inlet valves may be provided. This may be of particular relevance when different fluids might be characterised in sequence so as to reduce any contamination and fluid mixtures risks. This also allows to minimise either the whole system cleaning or the characterisation module operational delay.

It may be born in mind that as well as providing any convenient number of inlet channels, the system may provide any number of characterising modules as discussed above, implying a total number of valves equal to the number of inlet channels multiplied by the number of characterising modules.

It will be appreciated that notwithstanding the foregoing, not every characterising module need be connected to every inlet channel. Depending on the types of characterising module selected, and the nature of the fluids to be sampled, it may be found sufficient to connect only certain types of characterising modules to certain inlet channels, or only a certain subset of characterising modules of each type, so as to restrain the number of valves required.

In some cases it may also be appropriate to connect certain inlet channels to certain characterising modules without an intervening valve, for example where a particular inlet channel is set aside for the provision of a carrier fluid or the like.

Figure 3:
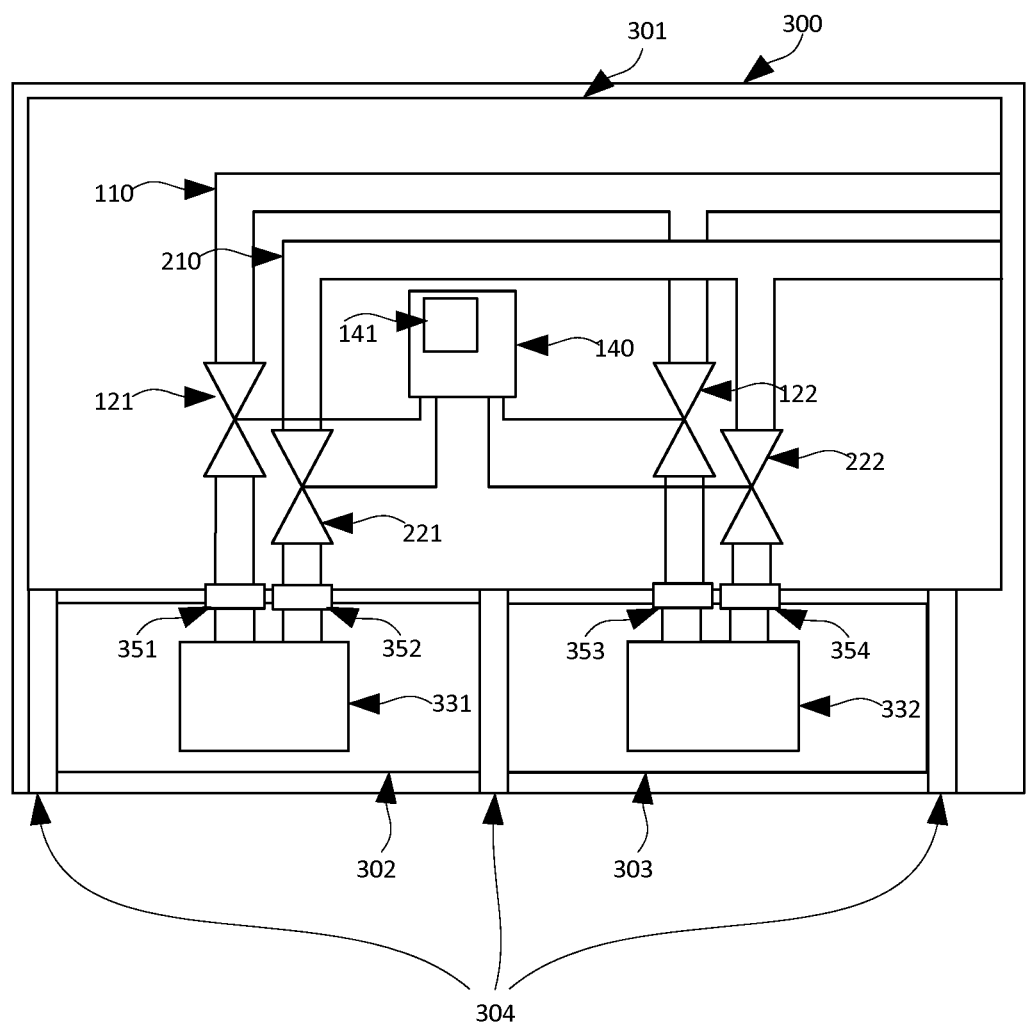
FIG. 3 shows a system in a third embodiment.

FIG. 3 shows a system in a third embodiment. As shown in FIG. 3 the system 300 for characterising fluid samples comprises the same components as described above with respect to FIGS. 1 and 2.

As shown in FIG. 3, the system further comprises a support structure represented schematically by elements 304, wherein each characterising module 302, 303 is removably mounted in the support structure 304, and wherein each characterising module 302, 303 receives fluid from a respective valve 121, 122, 221, 222 housed in a sampling unit 301 via a respective releasable input coupling 351, 352, 353, 354.

The support structure may comprise a rack mount arrangement for example a 19 or 21 inch rack structure compliant with EIA-310. As such the system may be adapted to be mounted in a standard rack enclosure. Where such an approach is adopted the characterising modules may each be provided with a housing also corresponding to the dimensional and other requirements of the same standard. In particular, each characterising module may constitute a 1U, 2U, 3U, 4U or any other size element, as a function of the characterising equipment and ancillary systems belonging to the module in question. In addition to the releasable input couplings 351, 352, 353, 354, certain modules may additionally comprise couplings such as electrical couplings for exchanging data signals with other parts of the system, sharing power, and the like. Any or all of these couplings may be provided on a backplane, which may be situated to the rear of the support structure in a manner such that when a characterising module is slid into the support structure, on reaching the end of its travel as dictated by the support structure its couplings automatically engage corresponding elements on the back plane.

Use of a common architecture backplane may facilitate support of multiple sensor types/modules, and may favour use of more than one sensor module simultaneously.

It will be appreciated that while as shown each characterising module is releasably mounted in the support structure, similar embodiments may be envisaged in which some characterising modules are releasably mounted, and others permanently fixed in place.

The constitution of releasably mounted (e.g. mounted in a manner susceptible of mechanical release) characterising modules supports the ad hoc selection of characterising modules as a function of the sample type or types to be characterised, or in response to the results of earlier characterisations.

In accordance with certain embodiments, certain characterising modules may be provided with machine readable data, and the system provided with means for reading this data. The machine readable data may take the form of a one or two dimensional bar code, an alphanumeric code, and electronically readable tag such as an RFID tag, or may comprise data stored in a memory housed in the characterisation module and readable through electronic contacts engaged by the support structure, backplane or the like, or any other convenient mechanism. The data may merely comprise a serial number or other such identity reference, and/or may comprise additional indications of the type, capacities or configuration of the characterising module.

The controller 140 may be adapted to retrieve machine readable data from one or more characterisation modules, and to compile the characterising program so as to comply with any operational limitations of the available characterising modules. Furthermore, the controller 140 may be adapted to compile the characterising program so as to obtain an optimal characterisation on the basis of the available characterising modules. Furthermore, the controller 140 may be adapted to compile the characterising program to attribute the available characterising modules to the characterisation of samples arriving on the different input channels so as to ensure an acceptable and optimum characterisation of each sample.

Accordingly, the fluid may be of a predefined type, and the type of each characterising module may be selected as a function of the type of the fluid sample, whereby the characterisations of the characterising modules in aggregate constitute an optimised characterisation of the fluid.

In certain embodiments, the system may further comprise a characterisation processor receiving characterisation data from one or more of the characterisation modules. The characterisation processor may be configured to generate a refined characterisation on the basis of data received from one or more of the characterisation modules. This refined characterisation may be generated on the basis of any known characteristics associated with the type of the fluid, and the characteristics of the characterising modules, for example as read from the machine readable data as discussed above, or retrieved from a database or other data source on the basis of an identifier read from the machine readable data, as well as any settings of the characterising modules as set by the controller 140. The processor itself may be configured to control certain characteristics of the characterising modules, for example to control operating conditions of the sensor or sensors in each characterising module, so as to obtain readings best suited to distinguish or characterise particular samples, as a function of the read or otherwise determined characteristics or capabilities of these devices. Once a characterisation or refined characterisation is available, the processor may compare this to model data, for example as stored in a reference database or other data source, so as to further characterise the fluid, by association with any reference fluids having similar characteristics.

On this basis, the processor may further be adapted to control the operation of the valves, so as to cause a fluid sample to be conveyed from an inlet channel to one or more characterising modules in accordance with a characterising program.

As such there is provided a system for characterising fluid sample, the system comprising one or more sample inlet channels configured to receive a fluid sample, one or more valves each receiving fluid from a the inlet channel, a support structure adapted to releasably receive a plurality of characterising modules comprising components adapted to characterise the fluid, wherein the system comprises a releasable coupling configured to releasably and sealingly (e.g. coupled in a manner minimising egress of the fluid) couple the inlet channel to each characterising module.

Correspondingly, there is provided a characterising module comprising components adapted to characterise a fluid, the module comprising features adapted to engage a support structure of a system for characterising a fluid sample, wherein the characterising module comprises a releasable coupling configured to releasably and sealingly couple with an inlet channel of the system to receive a fluid to characterise.

While FIG. 3 shows an accumulation of the features of FIGS. 1 and 2, it will be appreciated that other embodiments may comprise different combinations of features. For example, a modular support structure might be provided, without necessarily providing a plurality of inlet channels.

Figure 4:
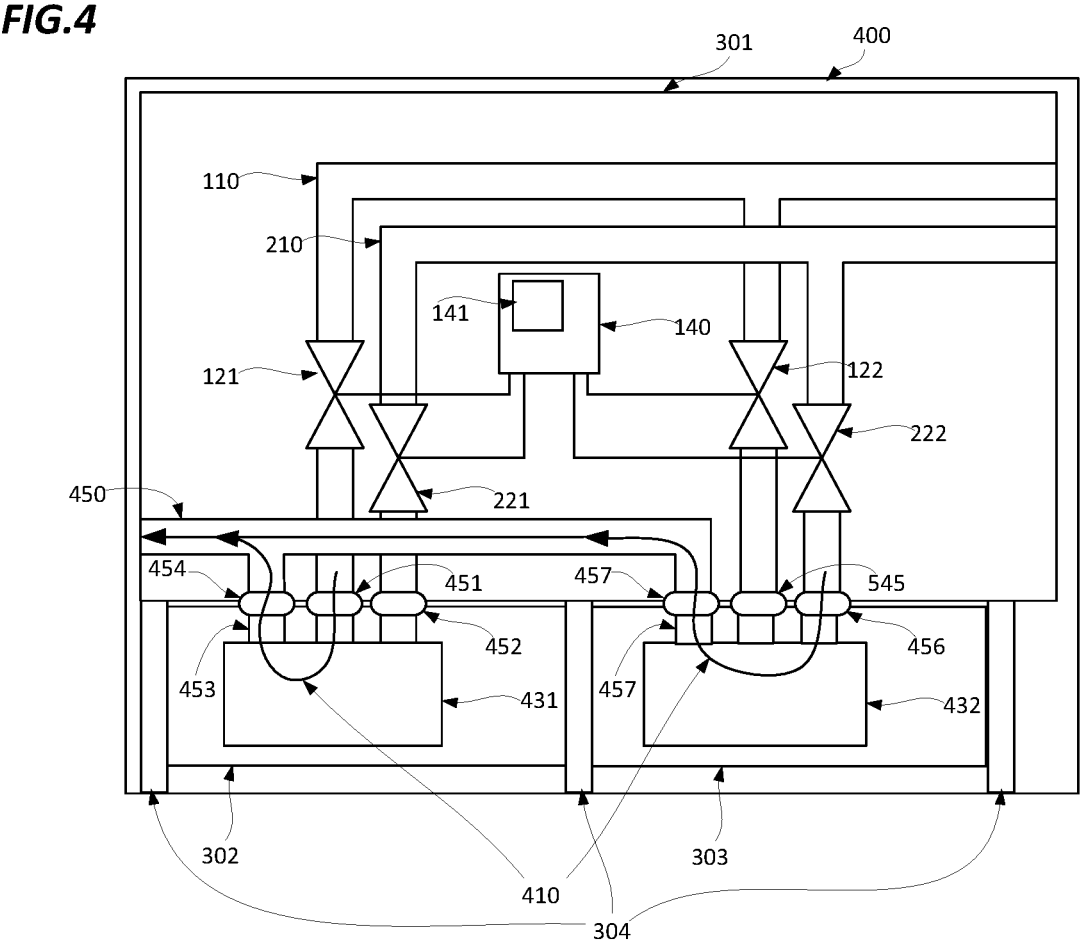
FIG. 4 shows a system in a fourth embodiment.

FIG. 4 shows a system in a fourth embodiment. As shown in FIG. 4 there is provided a system 400 for characterising a fluid sample.

As shown in FIG. 4 the system 400 comprises the same components as described above with respect to FIGS. 1, 2 and 3.

As shown in FIG. 4, the system additionally comprises an exhaust manifold 450, wherein each characterising module 431, 432 comprises an exhaust port 453, 457, wherein the exhaust port of each characterising module 431, 432 is configured to eject fluid received from the respective valve and processed by the respective characterising module into the exhaust manifold 450, as shown by the flow arrows 410.

As shown, the system further comprises a support structure 304, wherein each characterising module 431, 432 is removably mounted in the support structure, and wherein each characterising module 431, 432 ejects fluid into the exhaust manifold 450 via a respective releasable output coupling 454, 457.

While FIG. 4 shows an accumulation of the features of FIGS. 1, 2, and 3 it will be appreciated that other embodiments may comprise different combinations of features. For example, the outlet channel may be provided without providing the modular support structure might be provided, or a plurality of inlet channels.

Figure 5:
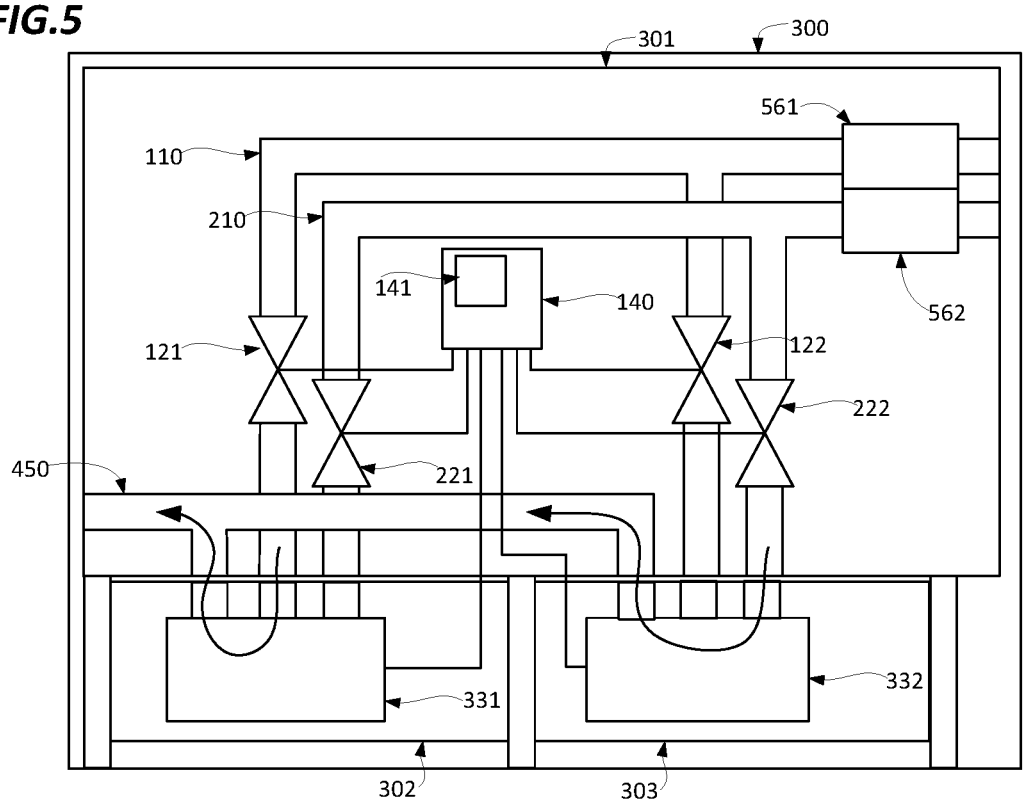
FIG. 5 shows a system in a fifth embodiment.

FIG. 5 shows a system in a fifth embodiment. As shown in FIG. 5 there is provided a system 500 for characterising a fluid sample.

On this basis, embodiments may be provided with arrangements for conditioning or selecting the fluid so that regardless of the state of the fluid elsewhere, as it reaches the characterising module it is in the appropriate form (state), and demonstrates the appropriate characteristics for that module. Such conditioning and selecting may comprise for example heating, cooling, diluting, concentrating, filtering and separation of phases. Separation of phases may involve separating a gas from a liquid, or one gas from another, or one liquid from another, or any other combination of fluid components as mentioned above.

As shown in FIG. 5 the system 500 comprises the same components as described above with respect to FIGS. 1, 2, 3 and 4. As shown in FIG. 5, the system additionally comprises a respective fluid separator 561, 562 for each inlet channel 110, 210.

Fluid separators 561 and 562 are examples of sample preparation/pre-processing units that may be provided between the inlet channel and one or more of the valves to condition a fluid arriving in the sample inlet channel. Other examples may include gas/liquid/solid separation, analyte concentration or dilution, chemical reaction, cooling, heating, drying, stirring, pressure modification, stabilisation, buffering, titration and so on. Additional valves may be provided to support channelling of sample fluids in different paths through various such pre-processing units before being output to one or more characterisation modules as described above, depending on operational requirements as defined for example in the characterisation program as discussed further below. Fluid separators might be connected to exhaust manifold 450 in order to discard unwanted fluid components.

Individual characterising modules may also incorporate sample preparation/pre-processing units that may be provided between the inlet channel and one or more of the valves to condition a fluid arriving from the valves before reaching the characterising unit of the module. Examples may include gas/liquid/solid separation, analyte concentration or dilution, chemical reaction, cooling, heating, drying, stirring, pressure modification, stabilisation, buffering, titration and so on. Additional valves may be provided to support channelling of sample fluids in different paths through various such pre-processing units within a characterising module before being characterised, depending on operational requirements as defined for example in the characterisation program as discussed further below.

In certain variants where the exhaust manifold 450 is provided, fluid separators may be configured to eject a portion of the input fluid to the exhaust manifold.

In certain variants where the exhaust manifold 450 is provided, one or more valves may be configured to eject the input fluid to the exhaust manifold.

As such, the system may comprise a fluid separator adapted to separate an input fluid into a first phase and a second phase, and to provide the first phase to an inlet channel. Each phase can be sent to different inlet channels to be further characterised.

It will be appreciated that not every inlet channel need be provided with a fluid separator. It will also be appreciated that while FIG. 5 shows fluid separators on the input side of the valves, they may additionally or alternatively be provided on the characterising module side of some or all valves.

As shown the controller 140 is in communication with not only the valves as described with reference to the embodiments of FIGS. 1 to 4, but also with the characterising modules 331, 332. In certain embodiments, the controller 140 may recover the output of the characterising modules, and in combination with the characterising program and the characteristics of the characterising modules, obtain the characterisation of each fluid sample.

Communications between the controller and the valves, and as the case may be between the controller and the characterisation modules, may occur using any convenient protocol. For example, communications may be performed using a standard protocol such as the Universal Serial Bus (USB), Serial Peripheral Interface (SPI), Inter Integrated Circuit (IIC), Serial ports, Controller Area Network (CAN), Ethernet, Wi-Fi, BLE, LORA, RF and so on.

While FIG. 5 shows an accumulation of the features of FIGS. 1, 2, 3 and 4 it will be appreciated that other embodiments may comprise different combinations of features. For example, the fluid separator may be provided without providing the releasable couplings, modular support structure, or plurality of inlet channels.

Figure 6:
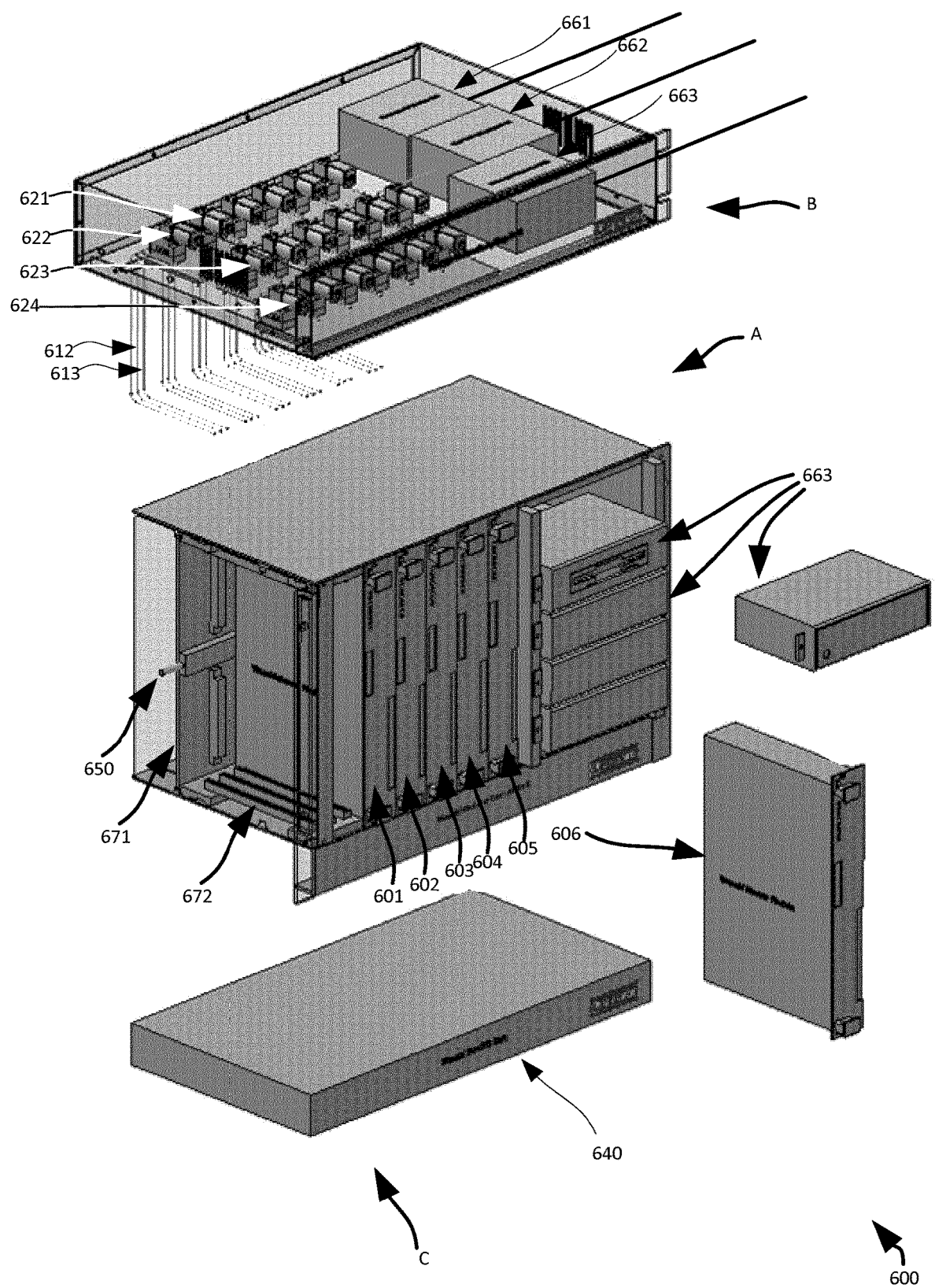
FIG. 6 shows a system in a sixth embodiment.

FIG. 6 shows a system in a sixth embodiment. As shown in FIG. 6 there is provided an exploded diagram of a system corresponding substantially to that shown schematically in FIG. 5. Specifically, there is provided a system 600 for characterising a fluid sample comprising a first sample inlet channel 661, a second sample inlet channel 662 and a third sample inlet channel 663, each configured to receive a fluid sample. There is further provided a first plurality of valves 621, 622, 623, 624 each receiving fluid from one of the inlet channels. There is further provided a plurality of fluid characterising modules 601, 602, 603, 604, 605, 606, each characterising module receiving fluid from a respective valve 621, 622, and a controller 640 in communication with the valves, the controller 640 being adapted to control the position of each valve in accordance with a characterisation program.

As discussed above, in this embodiment as in those associated with any of FIGS. 1 to 9, countless configurations are possible, including:
- characterising modules in series and/or in parallel;
- several characterising modules receiving fluid from a single valve;
- one characterising module receiving fluid from multiple valves;
- pre-processing units provided at any convenient point in the sampling module or any characterising module.

As shown the system comprises auxiliary modules 663. These may be storage devices such as hard disk drives, solid state storage and the like, power supply units, communications units, display units, i/o communications ports, or any other type of hardware as may be required.

As shown the system comprises a modular structure in which the characterising modules and auxiliary modules are stored in a sensor sub-rack module A, the valves and inlet channels are housed in an inline sampling unit B and the controller is in a control module C. The sensor sub-rack module comprises a backplane 671 which supports communications between the controller and the characterising modules, the valves and other components as appropriate. The sensor sub-rack module provides rails 672, which may constitute a support structure as described above for receiving characterisation modules.

As shown as an example, 18 valves are provided so as to permit the distribution of a fluid arriving on any of the three inlet channels 661, 662, 663 to any of the 6 characterising modules 601, 602, 603, 604, 605, 606.

Figure 7:
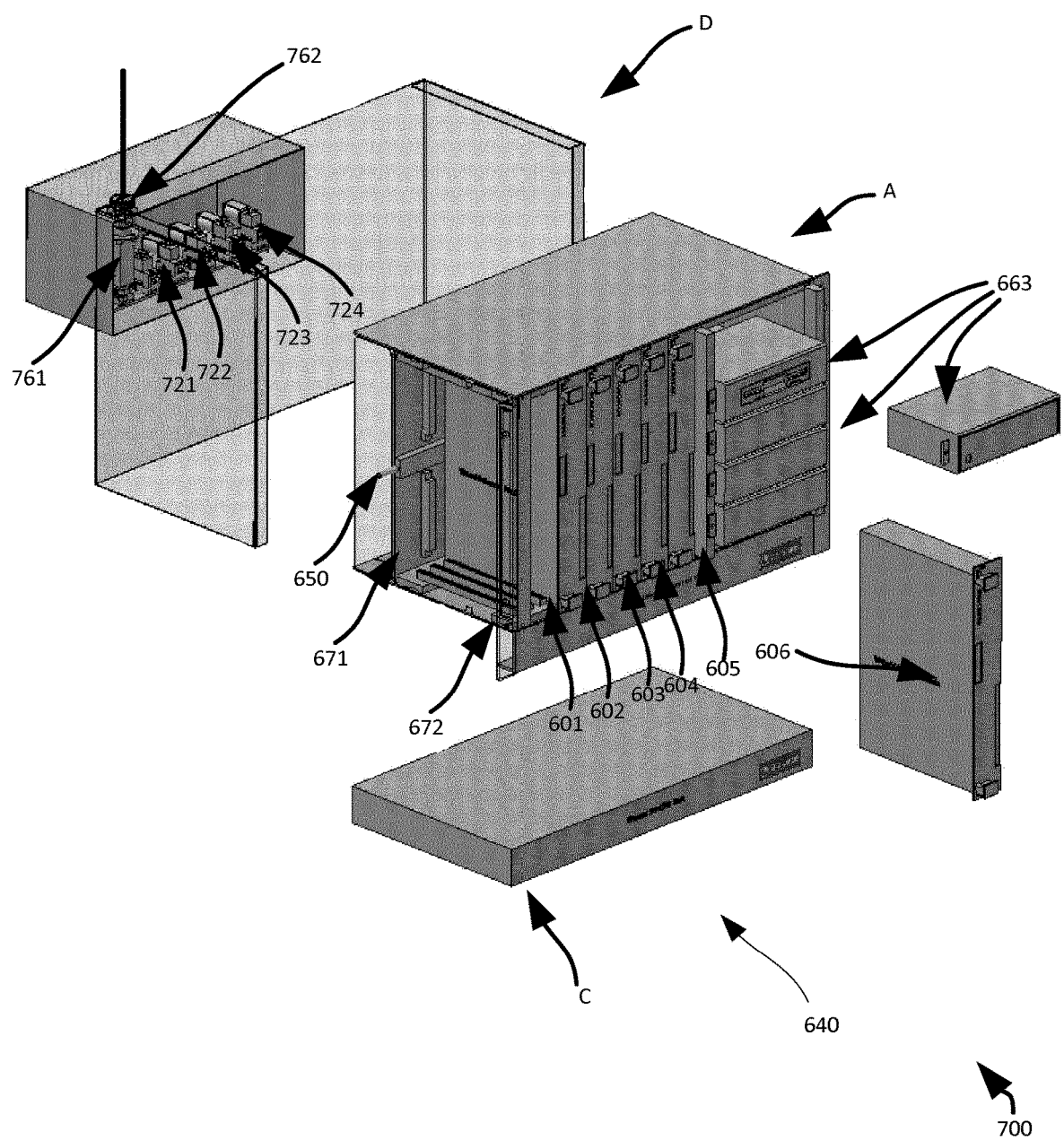
FIG. 7 shows a system in a seventh embodiment.

FIG. 7 shows a system in a seventh embodiment. As shown in FIG. 7 there is provided an exploded diagram of a system corresponding substantially to that shown schematically in FIG. 5. Specifically, there is provided a system 700 for characterising a fluid sample comprising a first sample inlet channel 761 configured to receive a fluid sample from an injector compatible with an auto sampler 762.

There is further provided a first plurality of valves 721, 722, 723, 724 each receiving fluid from the inlet channel. There is further provided a plurality of fluid characterising modules 601, 602, 603, 604, 605, 606, each characterising module receiving fluid from a given valve 721, 722, 723, 724, and a controller 640 in communication with the valves, the controller 640 being adapted to control the position of each valve in accordance with a characterisation program.

As such, the controller may be configured for example to:
- drive the different characterising modules and/or
- drive the different pre-processing modules and/or
- compute the data from the different characterising modules and/or
- extract key features and provide a characterisation of the fluid analyzed.

As shown the system comprises auxiliary modules 663. These may be storage devices such as hard disk drives, solid state storage and the like, power supply units, communications units, display units, i/o communications ports, or any other type of hardware as may be required.

As shown the system comprises a modular structure in which the characterising modules and auxiliary modules are stored in a sensor sub-rack module A, the valves and inlet channels are housed in desktop shroud D and the controller is in a control module C. The sensor sub-rack module comprises a backplane 671 which supports communications between the controller and the characterising modules, the valves and other components as appropriate. The sensor sub-rack module provides rails 672, which may constitute a support structure as described above for receiving characterisation modules.

As shown, the desktop shroud D is conceived to enclose the sensor sub-rack module A and control module C in a standalone desktop configuration, rather than in a larger rack system. Additionally, as mentioned above, instead of presuming that samples are received in line from a manufacturing installation, the arrangement of FIG. 7 provides an auto sampler as may be more appropriate to stand alone desktop use. It will be appreciated that other embodiments may comprise the desktop shroud element without using an auto sampler, or that rack mount systems such as shown in FIG. 6 may be provided with one or more auto sampler inputs in communication respectively with one or more inlet channels.

As such, the system can be converted from rack mount to desktop use, or vice versa, as required, by interchanging units B and D or the like.

While the system of FIG. 7 only comprises a single inlet channel in contrast to the arrangement of FIG. 6, it will be appreciated that in other embodiments any number of inlet channels may be provided. Indeed, more generally, either of the arrangements of FIG. 6 or 7 may be adapted to correspond to any of the configurations envisaged in the present description, including any of those described with respect to any of FIGS. 1 to 5.

In certain embodiments, for example as shown in FIG. 5, the inlet channels and exhaust manifold are aligned laterally with respect to the rack. On this basis, the inlet channels and exhaust manifold may be configured so as to sealingly engage one or more further systems, so as to constitute a set of common inlet channels and a common exhaust manifold. Accordingly, systems according to certain embodiments may be daisy chained so as to extend the capacity of the overall system to any desired extent. Other embodiments may achieve the same effects through a vertical alignment, or indeed any other convenient arrangement supporting coupling between systems. In some embodiments, electronic coupling between systems may also be implemented, for the sharing of power and/or data. On this basis, certain elements, in particular the controller, may be common to a plurality of systems.

Figure 8:
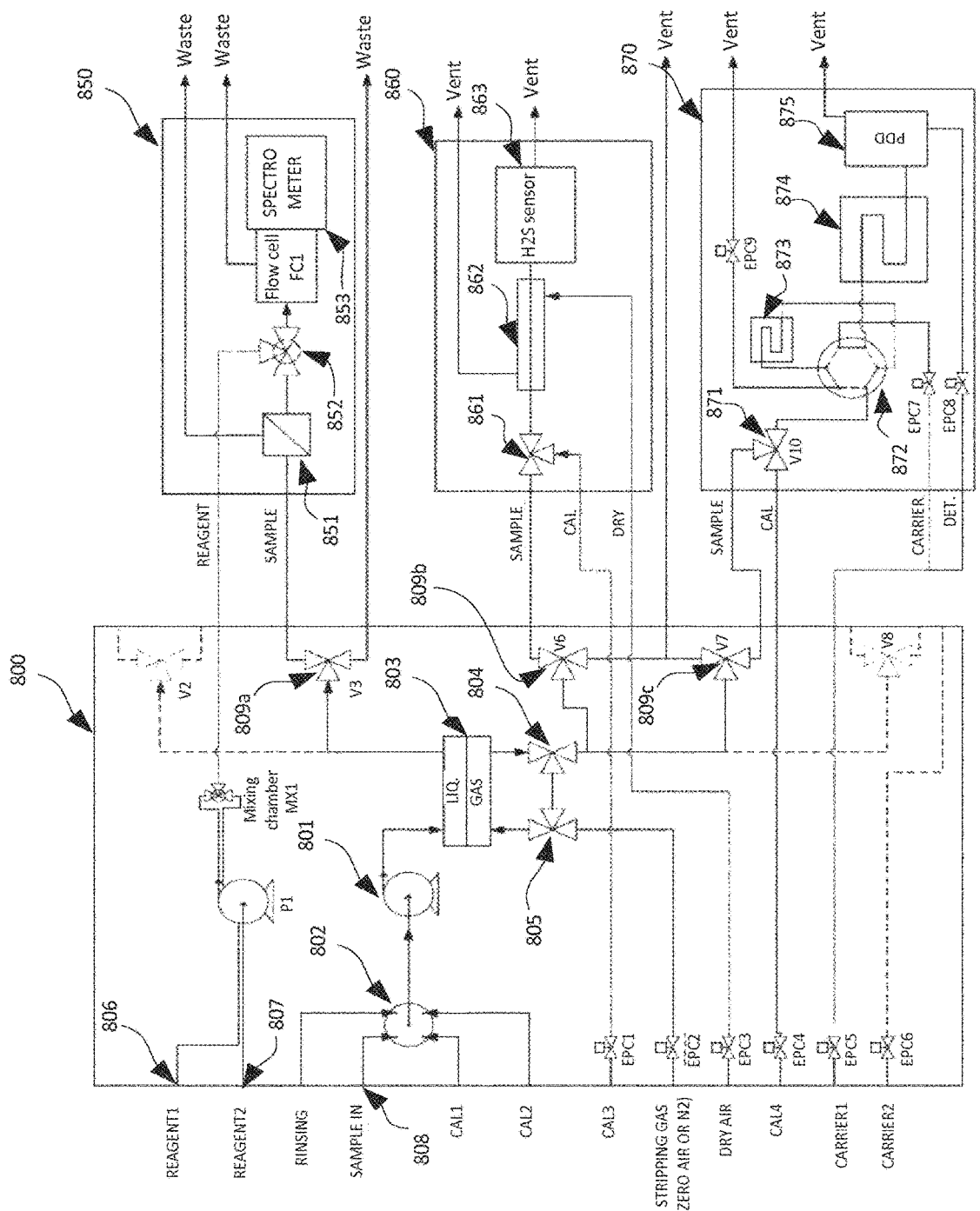
FIG. 8 shows a system in an eighth embodiment.

FIG. 8 shows a system in an eighth embodiment.

FIG. 8 presents a detailed implementation of a system in accordance with an embodiment incorporating specific selected modules for a specific scenario. Specifically, the system of FIG. 8 is configured to detect different classes of analytes in a production line of a beverage product.

As shown, in the sampling unit 800, corresponding for example to sampling unit 301 as described above, the sample arriving at inlet channel 808 is introduced by the peristaltic pump 801 (an example of a pre-processing unit as introduced with reference to FIG. 5 above) via the selection valve 802, it is directed to the Liquid/Gas exchanger 803 (an example of a pre-processing unit as introduced with reference to FIG. 5 above) where volatile species are extracted by a membrane (silicone PDMS for example).

The liquid phase containing the non-extractible compounds is directed by valve 809a to be analysed by characterising modules dedicated to liquid samples or to waste channels. In this example, a first characterising module 850 is dedicated to calorimetric iron detection at low-ppm levels.

A first reagent arriving at inlet 806 can be a solution of a complexation agent such as orto-phenanthroline that forms an orange complex with Fe2+ ions, a second reagent arriving at inlet 807 can be a solution of ascorbic acid in an acetate buffer. In characterising module 850, the sample passes through a debubbler 851 (an example of a pre-processing unit as introduced with reference to FIG. 5 above) and is then mixed in mixing chamber 852 (an example of a pre-processing unit as introduced with reference to FIG. 5 above) with the reactants before spectrometric detection in spectrometer 853, the iron orange complex is usually detected at 508 nm. Other reactants such as ferrozine (560-580 nm) for iron could be used, depending on the nature of the sample and of the iron to be detected.

The gas phase containing the compounds extracted through the membrane is directed by valve 809*b* and 809*c* towards modules 860 and 870 dedicated to gas analysis: characterising module 860 is a sensor module dedicated to H2S detection and characterising module 870 is a chromatographic module dedicated to the detection of trace levels of volatile organic compounds (VOC).

In characterising module 860, the sample is dried on a membrane 862 (an example of a pre-processing unit as introduced with reference to FIG. 5 above) such as Nafion®, this membrane 862 eliminates most of the water vapour from the sample, some organic compounds such as Ethanol that could interfere on the sensor 863 will also pass through the membrane 862 and will be eliminated by the dry stripping gas provided at membrane 862. The sensor 863 used here is an electrochemical sensor capable of detecting H2S at ppb levels. The valve 861 allows the injection of a calibrant for sensor re-calibration/diagnostics. Depending on the nature of the sample, another type of gas sensor such as a Metal Oxide Sensor, Photoionisation sensor, or Infrared Sensor could be used, with or without sample pre-processing.

In characterising module 870 the sample is pre-concentrated on a trap 873 (an example of a pre-processing unit as introduced with reference to FIG. 5 above) containing an adsorbent such as Tenax® TA at controlled flow and temperature. The trapped VOC are then thermally desorbed and injected by valve 872 in the chromatographic column 874 where they will be separated and detected. Here, the detector 875 is a Pulsed Discharge Detector capable of detection at ppb levels. Here, the column 874 is a short (2 to 10 m) narrow-bore (100-180 μm) capillary column that is rapidly heated and cooled to allow short analysis cycle times. The valve 871 allows the injection of a calibrant for sensor re-calibration/diagnostics.

The controller 140, 640 as described above may comprise a generic computing system, comprising a logic device and a storage device. The computing system may optionally include a display subsystem, input/output subsystem, communication subsystem, and/or other components. The logic device may include one or more physical devices configured to execute instructions. For example, the logic device may be configured to execute instructions that are part of one or more applications, services, programs, routines, libraries, objects, components, data structures, or other logical constructs, including the characterisation program. Such instructions may be implemented to perform a task, implement a data type, transform the state of one or more components, achieve a technical effect, or otherwise arrive at a desired result. The logic device may include one or more processors configured to execute software instructions. Additionally or alternatively, the logic device may include one or more hardware or firmware logic devices configured to execute hardware or firmware instructions. Processors of the logic device may be single-core or multi-core, and the instructions executed thereon may be configured for sequential, parallel, and/or distributed processing. Individual components of the logic device optionally may be distributed among two or more separate devices, which may be remotely located and/or configured for coordinated processing. Aspects of the logic device may be virtualised and executed by remotely accessible, networked computing devices configured in a cloud-computing configuration. The storage device may include one or more physical devices configured to hold instructions executable by the logic device to implement the methods and processes described herein. When such methods and processes are implemented, the state of storage device may be transformed—e.g., to hold different data. The storage device may include removable and/or built-in devices. The storage device may be locally or remotely stored (in a cloud for instance). Storage device may comprise one or more types of storage device including optical memory (e.g., CD, DVD, HD-DVD, Blu-Ray Disc, etc.), semiconductor memory (e.g., FLASH, RAM, EPROM, EEPROM, etc.), and/or magnetic memory (e.g., hard-disk drive, tape drive, MRAM, etc.), among others. Storage device may include volatile, non-volatile, dynamic, static, read/write, read-only, random-access, sequential-access, location-addressable, file-addressable, and/or content-addressable devices.

In certain arrangements, the system may comprise an interface adapted to support communications between the logic device and further system components.

Aspects of the logic device and the storage device may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The term "program" may be used to describe an aspect of computing system implemented to perform a particular function. In some cases, a program may be instantiated via logic device executing machine-readable instructions held by storage device. It will be understood that different modules may be instantiated from the same application, service, code block, object, library, routine, API, function, etc. Likewise, the same program may be instantiated by different applications, services, code blocks, objects, routines, APIs, functions, etc. The term "program" may encompass individual or groups of executable files, data files, libraries, drivers, scripts, database records, specific algorithms for analyte characterisation, etc.

As such, there is provided a modular fluid characterisation system comprising a sampling unit containing optional pre-processing units to condition samples and a valve network to distribute samples to one or more characterisation modules. Each characterisation module comprises one or more instruments for characterising samples, and optional additional pre-processing units. Characterising modules can be added or removed depending on operational requirements. Sample flows are controlled in accordance with an automated characterisation program, and resulting characterisation may be obtained on the basis of a combination of results from different characterisation modules with regard to the characterisation program.

Figure 9:
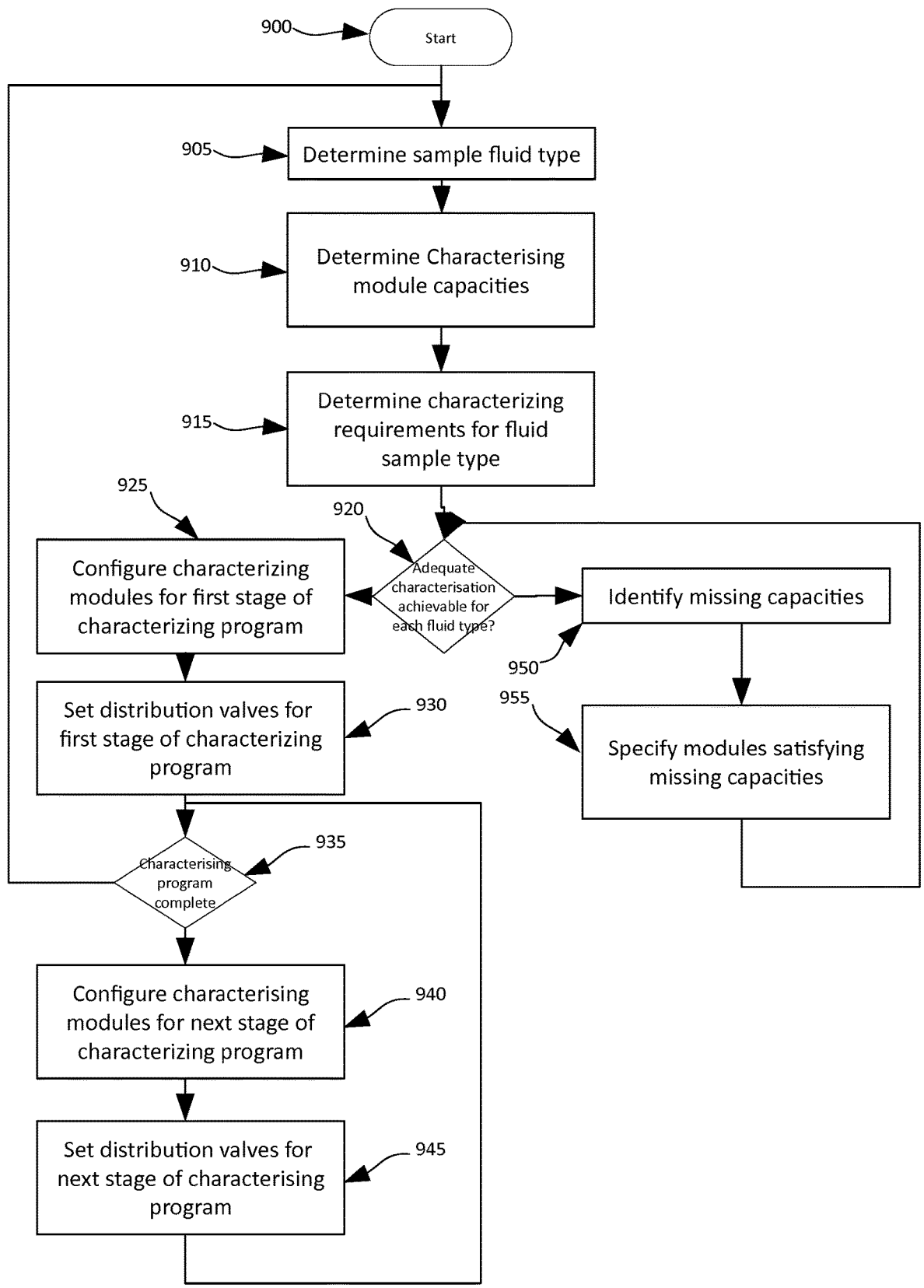
FIG. 9 shows a method of operating a system for characterising fluid samples in accordance with an embodiment.

FIG. 9 shows a method of operating a system for characterising fluid samples in accordance with an embodiment.

Characterisation modules may be automatically configured depending to the fluid/application needed. Once the requested module is identified, the system may be physically configured for that purpose. Optimisation may be performed so that when using the system, only the characterisation program has to be defined and the controller has to call the corresponding program with preset parameters for measurement and to proceed with data interpretation and results.

The method of FIG. 9 may constitute a mode of operation of a system as described above, implemented automatically under control for example of the controller 140. As such, the system may automatically and dynamically self-configure for a particular analyte.

As shown in FIG. 9 the method starts at step 900 before proceeding to step 905 at which a sample fluid type is determined. This determination may be from user input explicitly defining the sample type, from reading a barcode, RFID tag or other machine readable identifier or storage support to retrieve the type directly as stored therein, or with reference to a database associating identifiers with fluid types, or otherwise. Still further, the type may be determined by a preliminary characterisation cycle from one or more characterising modules as described above.

The type of fluid may be defined at varying degrees of granularity, from a mere distinction between gas or liquid for example, to a specific indication of the product to be analyzed: "olive oil", "diesel fuel" and so on. As discussed below, the purpose of the determination is to support an optimal selection of characterisation modules, and the required degree of granularity will depend on the range of sample types a particular system may be expected to encounter, and the range of characterising modules available.

Once the sample fluid type is determined, the method proceeds to step 910 at which the capacities of the available characterising modules are determined. This may comprise determining the types of modules, their range of measurements, and the degree to which their operating conditions may be controlled.

The method next proceeds to step 915, at which characterising requirements for the determined fluid sample type or types are determined. This may suggest consulting a database indicating key characteristics for particular fluid sample types. Additionally or alternatively, additional user input may be obtained for example to define a particular context. For example, with respect to olive oil one set of key characteristics may be defined for an overall assessment of quality, whilst a different set of key characteristics may be defined with a view to assessing geographic origin. The determination of characterising requirements may comprise the compilation of a characterising program as discussed above, whereby a sequence of valve operations and characterising module configurations is defined so as to obtain a series of measurements providing an optimal characterisation of the determined fluid type or types. Where a plurality of samples are to be assessed, e.g. from a plurality of inlet channels, the characterising program may additionally seek to achieve an optimised usage of the available characterisation modules chronologically, so as to minimise situations where the same characterising module is required to characterise different samples at the same time, avoiding inlet contamination and fastidious cleaning processes. Where applicable, the characterising program may specify configuration for any required pre-processing units either in the sampling unit or any characterisation module and associated distribution channel valves.

The method next proceeds to optional step 920 at which it is determined whether an adequate characterisation of the determined sample fluid type can be obtained with the available characterisation modules. For example, if an assessment of olive oil quality calls for a MOS sensor capable of operating at a certain temperature, if such a sensor is available in the one of the characterising modules currently belonging to the system, it may be determined that in this regard adequate characterisation may be achieved. If adequate characterisation may be achieved for all of the key characteristics, the method proceeds to step 925. If optional steps 920, 950, 955 are omitted, the method proceeds from step 925 to step 945.

At step 925 the method configures the characterising modules in accordance with the first state of the characterising program as defined at step 915, and at step 930 the valves are set so as to channel the appropriate characterising module in accordance with the first stage of the characterising program. Where applicable, any required pre-processing units and associated distribution channel valves may also be configured at this stage.

The method then proceeds to step 935 at which it is determined whether the characterising program is complete. If the characterising program is complete the method loops back to step 905 for a new characterisation cycle. Otherwise the method proceeds to step 940 at which the method configures the characterising modules in accordance with the next state of the characterising program as defined at step 915, and at step 945 the valves are set so as to channel the appropriate characterising module in accordance with the next stage of the characterising program, before looping back to step 935.

If at step 920 it is determined that the available characterising modules are unable to achieve an adequate characterisation of the or each fluid type, the method proceeds to step 950 at which the missing capacities are identified. The method then proceeds to step 955 at which modules satisfying the missing capacities are specified. This may comprise submitting a part number or reference, or specifying a field modification of the available characterisation modules.

It will be appreciated that the steps of FIG. 9 may be implemented in different sequences without changing their effect. For example, steps 910 and 915 might be inverted or performed at the same time, steps 925 and 930 might be inverted or performed at the same time, steps 940 and 945 might be inverted or performed at the same time, and so forth.

Optionally, the further steps of receiving outputs from said characterisation modules in response to execution of said characterising program, and processing said outputs to obtain a final sample characterisation may be implemented. It will be appreciated that which every measurement performed with respect to a sample can be considered to be a characterisation thereof, the final sample characterisation may comprise a combination of measurements sufficient to provide an overall characterisation of the sample for a particular purpose. This may include drawing deductions from the combinatorial characteristics of the measurements used, and performing categorisation of the sample.

The steps of FIG. 9 may be implemented by means of a software application, which performs the different steps in the manner described when executed on a compatible computing device. For example, the steps of FIG. 9 may be implemented by means of a software application, which performs the different steps in the manner described when executed on the controller 140, 640 as presented above.

The steps of FIG. 9 themselves may serve to define the characterisation program, which when executed on a system as described above, for example when executed on the controller 140, 640, causes the system to obtain a characterisation of a fluid sample.

It will be understood that the configurations and/or approaches described herein are exemplary in nature, and that these specific embodiments or examples are not to be considered in a limiting sense, numerous variations being possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A system for characterising a fluid sample, said system comprising:
   a first sample inlet channel configured to receive a fluid sample;
   a first plurality of valves each receiving fluid from said first sample inlet channel;
   a plurality of different types of fluid characterising modules, each said different type of fluid characterising module comprising respective components adapted to characterise a fluid and receiving fluid from a respective one of said plurality of valves via the first sample inlet channel; and
   a single controller in communication with each of said plurality of valves, said single controller being adapted to control the position of each said valve and direct the flow of fluid into the plurality of different types of fluid characterising modules at desired times in accordance with a characterisation program,
   wherein said system further comprises a support structure, wherein each said different type of fluid characterising module is removably mounted in said support structure, and wherein each said different type of fluid characterising module receives fluid from a respective said valve via a respective releasable input coupling,
   wherein each of said different types of fluid characterising modules is selected from a plurality of different fluid characterising module types comprising: a gas chromatograph, a gas sensor, a liquid sensor, a spectrometer, an ion specific electrode, or an array of a plurality of the foregoing.

2. The system of claim 1 further comprising one or more pre-processing units, each said pre-processing unit being provided between said first sample inlet channel and one or more of said first plurality of valves, said pre-processing units being adapted to condition a fluid arriving in said first sample inlet channel.

3. The system of claim 2, wherein one or more of said pre-processing units comprises one of a gas/liquid/solid separation unit, an analyte concentration or dilution unit, a chemical reaction unit, a cooler, a heater, a dryer, a stirrer, a pressure modification unit, a stabilisation unit, a buffering unit, or a titration unit.

4. The system of claim 2, wherein said system comprises one or more further inlet channels, and one or more respective pluralities of valves receiving fluid from a respective said further inlet channel, wherein one or more said pre-processing and/or characterising modules are coupled to receive fluid from a respective said valve receiving fluid from said first sample inlet channel and each said further inlet channel respectively, such that by operation of said valves a fluid sample may be conveyed from any said inlet channel to any said characterising module.

5. The system of claim 1, wherein said system comprises an exhaust manifold, and wherein each said different type of fluid characterising module comprises an exhaust port, wherein the exhaust port of each said different type of fluid characterising module is configured to eject fluid received from the respective said valve and processed by said respective different type of fluid characterising module into said exhaust manifold.

6. The system of claim 5, wherein each said different type of fluid characterising module ejects fluid into said exhaust manifold via a respective releasable output coupling.

7. The system of claim 1 wherein said fluid is of a predefined type, and wherein the type of each said different type of fluid characterising module is selected as a function of the type of said fluid sample, whereby the characterisations of said characterising modules in aggregate constitute an optimised characterisation of said fluid.

8. The system of claim 1, further comprising a characterisation processor, said characterisation processor receiving characterisation data from each said different type of fluid characterisation module, said characterisation processor being configured to generate a refined characterisation on the basis of the data received from each said different type of fluid characterisation module.

9. The system of claim 8, wherein said characterising processor is further adapted to control the operation of said valves, so as to cause a fluid sample to be conveyed from a said first sample inlet channel to one or more said different types of fluid characterising modules in accordance with a characterising program.

10. The system of claim 1, wherein one or more inlets are adapted to receive said fluid in-line from a production channel, or wherein the one or more inlets are adapted to receive said fluid in-line from an auto sampler.

11. The system of claim 1, wherein each of the different types of fluid characterising modules is of equal dimensions.

12. The system of claim 1, wherein each of the different types of fluid characterising modules has at least one substantially planar surface, and wherein the dimensions of each of the different types of fluid characterising modules are such that when mounted in said support structure, said at least one substantially planar surface is substantially coplanar with an outer surface of said support structure so as to define a continuous closed volume.

13. The system of claim 1, wherein an element of said releasable input coupling belonging to each said different type of fluid characterising module is in the same position on each said different type of fluid characterising module.

14. The system of claim 1, wherein each said different type of fluid characterising module is removably mounted in said support structure on one or more rails such that said different type of fluid characterising module can be slidingly mounted in said support structure and slidingly removed therefrom.

15. The system of claim 1, wherein an element of said releasable input coupling belonging to each said different type of fluid characterising module being adapted so as to sealingly engage a respective element of said releasable input coupling belonging to said support structure when said different type of fluid characterising module can be slidingly mounted in said support structure, and to disengage when slidingly removed therefrom.

\* \* \* \* \*